(12) United States Patent
Cote et al.

(10) Patent No.: US 7,043,368 B1
(45) Date of Patent: May 9, 2006

(54) METHOD AND SYSTEM FOR CREATING VISUALIZATIONS OF FUTURE WEATHER CONDITIONS

(75) Inventors: Peter Cote, Littleton, MA (US); Chester Liu, Winchester, MA (US); Joseph S. D'Aleo, Hudson, NH (US)

(73) Assignee: WSI Corporation, Billerica, MA (US)

( * ) Notice: Subject to any disclaimer, the term of this patent is extended or adjusted under 35 U.S.C. 154(b) by 496 days.

(21) Appl. No.: 10/408,483

(22) Filed: Apr. 7, 2003

Related U.S. Application Data (60) Provisional application No. 60/370,662, filed on Apr. 8, 2002.

(51) Int. Cl.
   *G01V 1/00* (2006.01)
(52) U.S. Cl. .......................................... 702/3; 345/419
(58) Field of Classification Search .................... 703/3; 701/200; 707/1, 3; 702/5, 3; 15/339; 709/242; 725/27; 382/159; 345/419
See application file for complete search history.

(56) References Cited

U.S. PATENT DOCUMENTS

| | | | | |
|---|---|---|---|---|
| 5,265,024 A | * | 11/1993 | Crabill et al. | 701/200 |
| 5,654,886 A | * | 8/1997 | Zereski et al. | 702/3 |
| 5,848,378 A | * | 12/1998 | Shelton et al. | 702/3 |
| 6,188,960 B1 | * | 2/2001 | Baron et al. | 702/3 |
| 6,496,780 B1 | * | 12/2002 | Harris et al. | 702/3 |

\* cited by examiner

*Primary Examiner*—John Barlow
*Assistant Examiner*—Victor J. Taylor
(74) *Attorney, Agent, or Firm*—Woodcock Washburn LLP (57) ABSTRACT

Systems and methods for providing visualizations of forecast weather in accordance with information received from a forecast database. A forecast engine generates analysis and forecast grids indicative of weather conditions which is stored at a weather data server. A data processor receives user inputs and converts the grids into data representative of predetermined objects within a scene. An element generator generates the objects as graphical elements, and a render receives the graphical elements and renders the scene. The system automatically generates a plurality of scenes as a visualization of weather over a predetermined period of time in accordance the grids for previous time periods through future time periods.

56 Claims, 7 Drawing Sheets

METHOD AND SYSTEM FOR CREATING VISUALIZATIONS OF FUTURE WEATHER CONDITIONS

CROSS REFERENCE TO RELATED APPLICATIONS

The present invention claims the benefit of priority of U.S. Provisional Application No. 60/370,662, filed Apr. 8, 2002.

FIELD OF THE INVENTION

The present invention generally relates to the field of information presentation systems. More particularly, the present invention relates to a system and method for generating visualizations of forecasted weather conditions based on information from a forecast database.

BACKGROUND OF THE INVENTION

Conventional video and graphic presentation systems used for weather have several limitations with respect to their ability to accurately visualize weather information. First, data representations are typically scientific in nature, displaying weather conditions in a symbolic manner. While this is useful to meteorologists, it does not give the broader viewing audience a visual representation of what they might expect to see should they look out the window at a particular time in the future.

Second, while computer graphics systems and techniques have been applied towards rendering realistic and visually compelling renditions of atmospheric conditions, they have been limited by the need for the user or creator of said systems and visualizations to provide a large amount of input to the system in terms of defining the positions, states and motion of weather events in order to generate a realistic visualization.

Third, weather systems typically present historical weather information separately from the display of forecast weather information. In general, the display of historical information is the result of display information from weather sensors (radars, weather reporting stations, satellites), while the display of forecast information is based on the output of computer-based atmospheric models. This discontinuity makes it difficult for the viewer to get a sense of how the weather is changing over time.

Thus, in view of the foregoing, there is a need for systems and methods that overcome the limitations and drawbacks of the prior art. In particular, there is a need for a system that provides automatically generated visualizations of weather over time, seamlessly blended from the past to the future. The present invention provides such a solution.

SUMMARY OF THE INVENTION

The present invention is directed to systems and methods for generating a visualization of future weather conditions. The systems and methods include a forecast engine that generates weather forecasts, a weather data server that stores the forecasts, a data processor that retrieves and processes forecast information from the weather data server in accordance with predetermined inputs, an element generator that converts the forecast information into graphical elements, and a renderer which receives the graphical elements and renders a sequence of plural images for a specific geographic region, for a specific range of times. The sequence of plural images reflects the changes in weather forecast information over the specified range of times.

In accordance with a feature of the invention, the forecast engine may receive a plurality of gridded computer models, radar data, satellite imagery and synoptic reports as input to generate the weather forecasts. The forecast engine may use the inputs to generate the weather forecasts such that the weather forecasts are seamless over time with respect to observed current and past weather conditions. Forecast errors may be determined by comparing previous forecasts with observed weather conditions and wherein the forecast errors are used as corrections to the forecast. The weather forecast generated may include at least one of cloud types, cloud levels, cloud density, precipitation types, precipitation rate and lightning probability. Further, the weather forecast may be generated for a sequence of times extending from the current time into the future and for multiple levels of the atmosphere.

In accordance with another feature, a weather data server may provide forecast information for a specific time in the past or future. Also, the forecast information may be adapted to be modified with respect to value, temporality or geographic location.

In accordance with yet another feature, graphical elements may be selected for rendering based on forecast weather conditions for the geographic location to be rendered. The graphical elements may include at least one of clouds, precipitation, lightning, waves, plant life, structure and animals. The cloud elements may be defined by at least one of cloud evolution, cloud type, virga and fog. The precipitation elements may be defined by at least one of raindrops, snowflakes, sleet, freezing rain and hail. The plant life, structures and animals may be modified visually such that they are affected by conditions indicated by the forecast information. Further, the plant life, structures and animals may be selected by the system such that they are geographically appropriate to the geographic region to be rendered.

In accordance with a further feature, a plurality of graphical elements are provided to be rendered and wherein predetermined ones of the graphical elements are used to create the visualization. Further, the graphic elements may rendered for a predetermined geographic location and range of times. In addition, the geographic location is adapted to be modified over time such that a fly-through animation is generated.

The system may select from a plurality of visualization techniques such that the visual representation of the forecast information is visually correct for the geographic positions. Also, the graphical elements may be rendered relative to a three dimensional representation of the earth. The graphical elements are rendered such that they are visually correct with respect to the specific time of day for which the forecast is rendered. The range of times may include times in the past, present or future, and is visually consistent across the selected range of times, regardless whether the time is in the past, present or future. Further, the visualization may incorporate a time indicator selected from the group consisting of a clock face, a time line, a numeric time display. The rendered visualization may be output via a broadcast medium, wherein the broadcast medium comprises at least one of over-the-air television, cable, satellite, a wide area network, and cellular services.

In accordance with another aspect of the invention, there is provided a method for generating weather forecasts from raw weather data. The method includes receiving observational and atmospheric model weather data, analyzing the raw weather data, performing a re-analysis to determine realistic weather parameters and forecast errors, and determining a set of grids in accordance with the analysis representative of a short term forecast and a medium range forecast. The grids provide a time-coherent, seamless weather forecast over past, present and future times.

In accordance with a feature of the invention, receiving observational and atmospheric model weather data includes receiving a plurality of gridded computer models, radar data, satellite imagery and synoptic reports. Determining forecast errors may be performed by comparing previous forecasts with observed weather conditions and the forecast may be corrected using the forecast errors. The weather forecast includes at least one of cloud types, cloud levels, cloud density, precipitation types, precipitation rate and lightning probability. Also, the weather forecast may be generated for a sequence of times extending from the current time into the future. Further, the forecast may be generated for multiple levels of the atmosphere.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The present invention is directed to systems and methods for providing visualizations of forecast weather based on information received from a forecast database. In accordance with the present invention, visualizations of weather over time are generated automatically and seamlessly blended from the past to the future.

The present invention provides for simulating and visualizing the environment at any given time, from any given viewpoint. As used herein, the environment includes atmospheric conditions, living organisms, man-made constructions, etc. (i.e., all things in a geographic surrounding). The system accepts as inputs, volumetric gridded data for past, present and future times containing information regarding cloud density, type and thickness, wind direction and speed, precipitation type, and lightning frequency. Also, camera position and orientation, time of day and day of year inputs may be accepted.

The system produces an animated output which includes: photorealistic clouds, precipitation, lightning, cloud growth and decay, and precipitation which accumulates and forms puddles, etc. Ground objects are produced, which may include, but are not limited to vegetation, animals, buildings and other human constructions. The choice of these objects is appropriate to the environment at a user-defined location. Further, objects such as smoke and flags respond to the wind speed and direction. Also, sky color, shadows, sunrises, sunsets, stars at night, haze, etc., which correspond to the time of day and day of year are produced by the system. Further, the cloud, precipitation and ground objects may be sequenced into a fly-through animation in accordance with user inputs.

Figure 1:
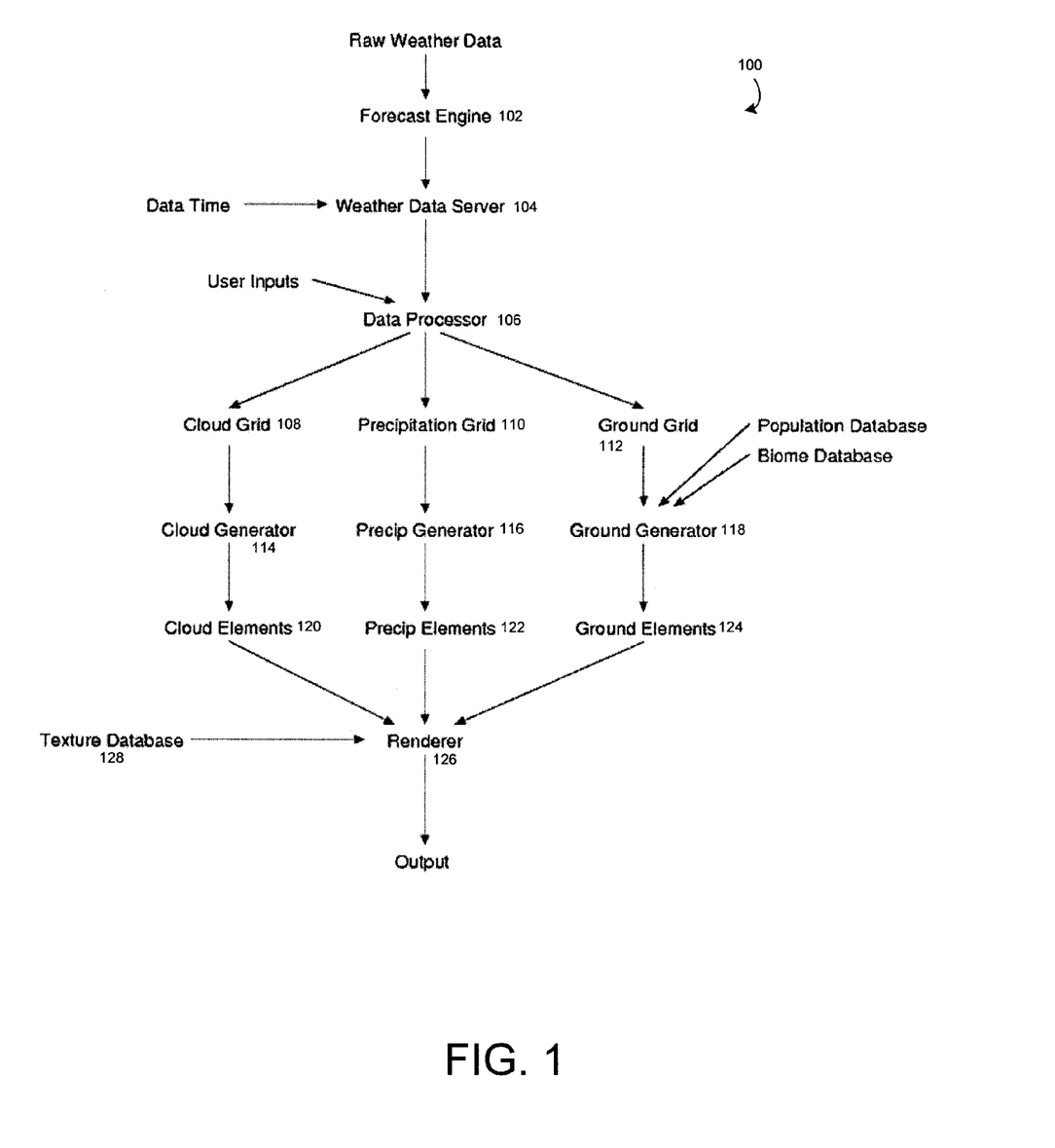
FIG. 1 is a flowchart illustrating an overview of the processes performed by the system of the present invention.
Figure 2:
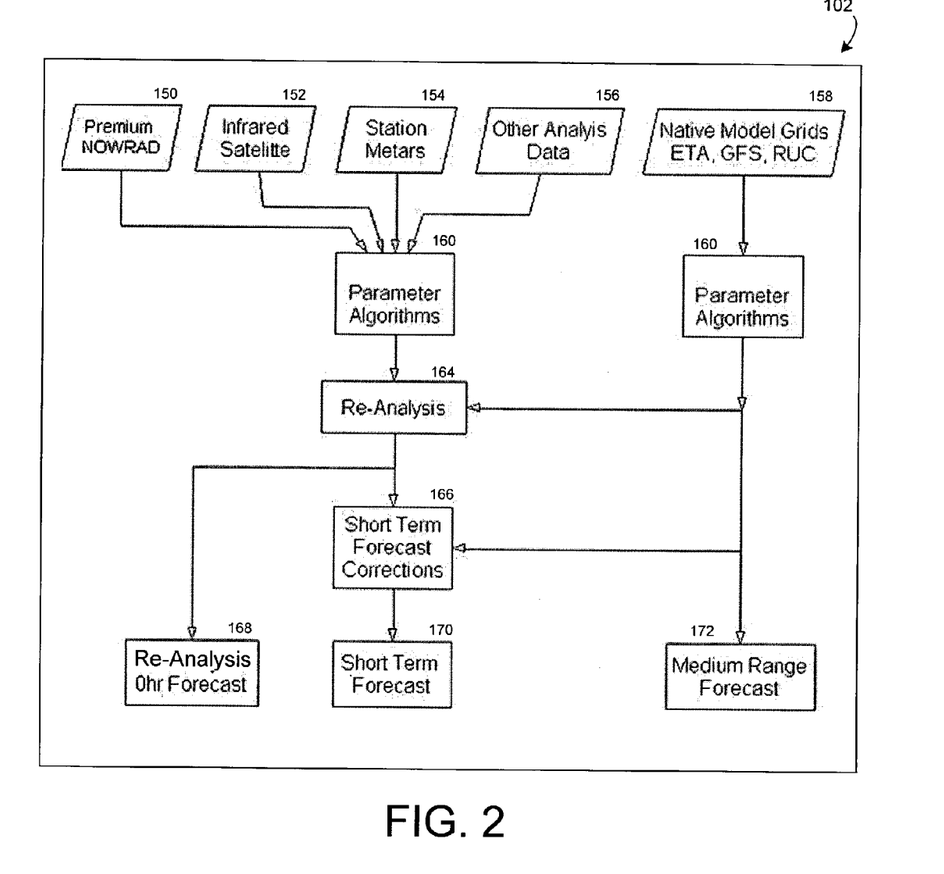
FIG. 2 is a block diagram illustrating the components of a forecast engine.

Referring now to FIG. 1, there is illustrated an overview of the system 100 of the present invention. Raw weather data from various sources (e.g., National Weather Service, etc.) is received by a forecast engine 102. As shown in FIG. 2 the raw weather data may be observational in nature, such as, NOWRAD 150, Satellite 152, Metars 154, and Other Analysis Data 156. The raw weather data may also comprise atmospheric model grids, such as ETA, GFS or RUC 158. The source data includes but is not limited to satellite data, Doppler radar, surface data, upper air data and native model grids.

The forecast engine 102 combines the use of algorithms 160 (described below with reference to FIGS. 3 and 4) and the data sources 150–158 into a set of analyses and forecast grids. Forecast grids are well known in the art. In accordance with the present invention, the grids have a high spatial and temporal resolution and represent a set of realistic weather parameters. The grids can be used to create a realistic visualization of weather conditions over a temporal range representing past, current and future time periods. The gridded data contains information about cloud density, type and thickness; wind direction and speed; precipitation type and intensity; lightning frequency; and temperature and relative humidity. The timeline (or temporal range) of the grids consists of three parts: re-analyses 166, short term forecast 170 and medium range forecast 172.

The re-analysis data 164 is generated with the several types of source data 150–156. Several algorithms convert the analyses data into realistic weather parameters. For example; base reflectivity levels from radar in combination with a 3-D grid of temperatures are used to create an analysis of precipitation rate and type; satellite imagery is used with a 3-D grid of temperature and moisture to create a grid of cloud cover, thickness and type. The analysis source data 150–156 is processed in this manner, converted to grid form and merged with native model grids to create a re-analysis grid 168.

Forecast errors 166 are also computed by comparing previous forecasts with the re-analysis. These forecast errors 166 are then used as corrections to short-term forecasts 168. This serves to both improve the accuracy of the short-term forecasts and to create a seamless transition on the timeline from analysis data to forecast data.

Medium range forecast grids 172 are generated by algorithms, which use native model grid parameters as inputs. The algorithms are designed to convert several types of native model parameters into parameters that represent realistic sensible weather.

Figure 3:
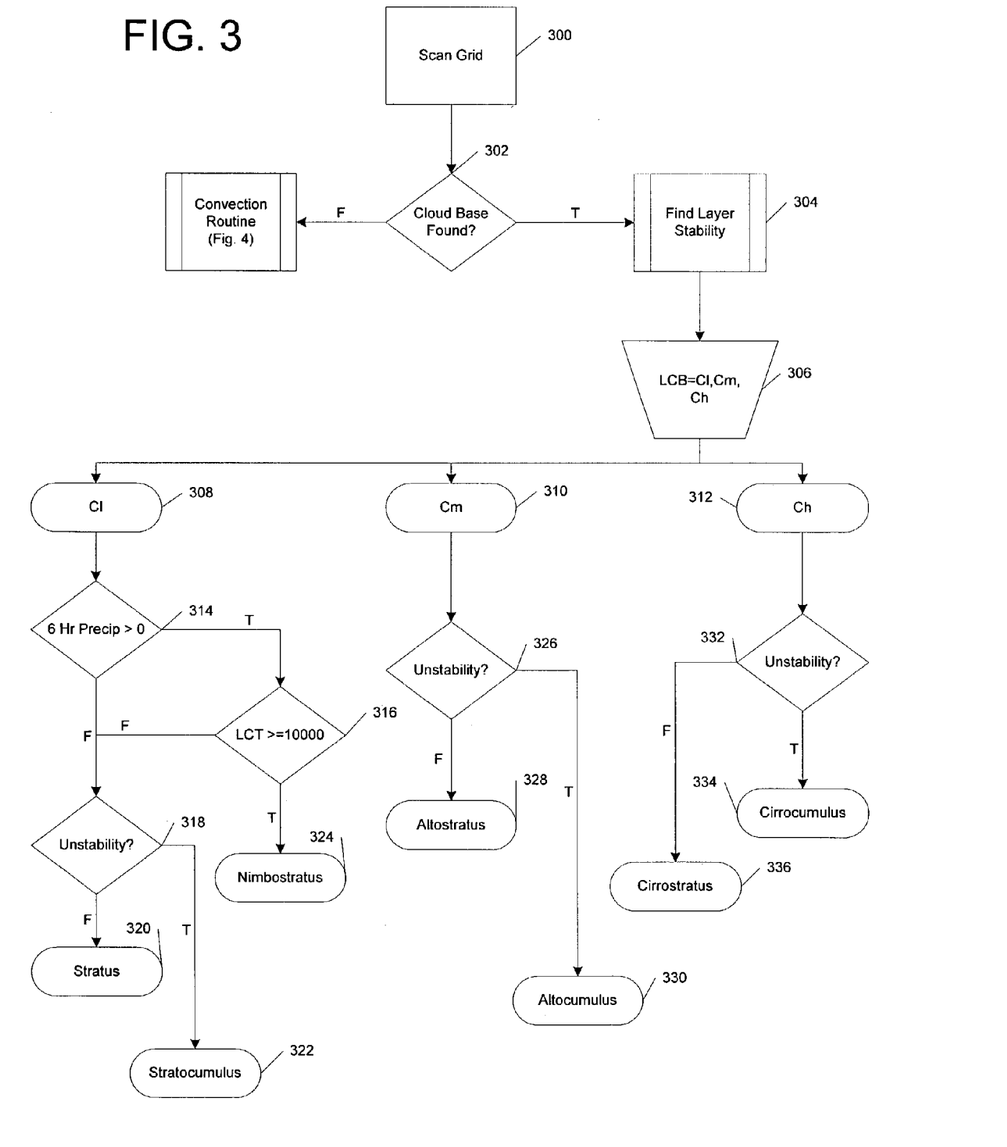
FIG. 3 is the flowchart illustrating the processes performed in generating a cloud grid.

The algorithms 160 used to generate the grids within the forecast engine 102 will now be described in further detail with FIGS. 3–4. The grid of clouds specifies cloud cover, cloud type and cloud size for multiple layers of the atmosphere. In accordance with the present invention, four layers of the atmosphere are defined; however, additional or fewer layers may be used. The four layers are defined herein as a boundary layer, lower layer, middle layer, and high layer. The cloud grid seamlessly defines cloud cover from past, to present, to future times. Table 1 defines the cloud cover in four layers, plus vertical growth.

TABLE 1

| Cloud Group | Cloud Layer (mb) | Cloud Base Height (m) | Typical Cloud Types |
|---|---|---|---|
| High | 350–150 | 5000–13000 | Cirrus Cirrostratus Cirrocumulus |
| Middle | 650–350 | 2000–7000 | Altostratus Altocumulus |
| Lower | 1000–650 | 0–200 | Stratus Stratocumulus Nimbostratus |
| Boundary Layer | 0–900 | 0 | Fog |
| Clouds with Vertical Growth | 1000–300 | Up to 12000 | Cumulus Cumulonimbus |

Clouds are defined and detected by satellite and/or model data. Satellite data is provided through infrared detection of the tops of clouds to determine height. Lower clouds and fog depth can be determined by using the temperature difference between Infrared band 2 (3.9 μm) and Infrared band 4 (10.7 μm). Visible satellite images can also be used to determine cloud positions.

Model data may also be used to determine cloud coverage. For example, relative humidity, large-scale saturation adjustment (used in AVN and NGM models), and explicit cloud prediction (used in the ETA, MesoETA and Predictor models) schemes can be used to determine cloud coverage. Such models are well known to those of ordinary skill in the art.

Cloud type determination is accomplished by analyzing stability indices. There are several common indices known to those of ordinary skill in the art. In a preferred embodiment, a combination of 4 layer Lifted index and Convective Available Potential Energy (CAPE) are used to determine if clouds are convective or stratus. CAPE gives an indication of the stability of the atmosphere. In general, the higher the CAPE value, the more unstable the atmosphere is. CAPE is used to determine if shallow or deep convection exists.

Once cloud type and coverage for all layers is defined for a grid point for a particular time, the information may be presented as one grid containing all information (e.g., 3 layers of clouds, 4 types of coverage, 2 types of clouds) as follows:

| Grid Value | Cloud Type |
|---|---|
| 0 | Low-Clear-Stratus Mid-Clear High-Clear |
| 1 | Low-Scattered-Stratus Mid-Clear High-Clear |
| 2 | Low-Scattered-Stratus Mid-Scattered High-Clear |
| 3 | Low-Scattered-Stratus Mid-Scattered High-Scattered |
| 4 | Low-Broken-Stratus Mid-Clear High-Clear |

-continued

| Grid Value | Cloud Type |
|---|---|
| 5 | Low-Broken-Stratus Mid-Scattered High-Clear |
| 6 | Low-Broken-Stratus Mid-Scattered High-Scattered |
| . . . | . . . |

Cloud coverage from past time periods can be defined based on data from RUC models or objective analysis based on Metars, Upper Air, Satellite and Radar.

As noted above, the system of the present invention utilizes data from the atmospheric models to determine the forecast grids. With reference to FIG. 3, the system of the present invention generates cloud forecast information (i.e., a cloud grid) from the atmospheric models as follows. The grid data is scanned at step 300, and it is determined if a cloud base is found at step 302. If none is found, the process jumps to the convention routine (FIG. 4). If a cloud base is found, the layer stability is determined at step 304. The layers may be lower 308, middle 310 or higher 312 (step 306).

If a lower layer is determined (308), then the six hour precipitation forecast is determined (step 314). If it is greater than zero, then at step 316 it is determined if the Level of Cloud Top (LCT) is greater than or equal to 10,000 ft. If it is, then at step 324, it is determined that nimbostratus clouds are to be forecast. If the LCT is less than 10,000 ft., then at step 318, it is determined if the grid data indicates unstability. If yes, then at step 322, it is determined that stratocumulus clouds are to be forecast; otherwise, at step 320 stratus clouds are to be forecast.

If a middle layer is determined (310), then at step 326, it is determined if the grid data indicates unstability. If yes, then at step 330, it is determined that altocumulus clouds are to be forecast; otherwise, at step 328 altostratus clouds are to be forecast.

If an upper layer is determined (312), then at step 332, it is determined if the grid data indicates unstability. If yes, then at step 330, it is determined that cirrocumulus clouds are to be forecast; otherwise, at step 336 cirrostratus clouds are to be forecast.

Figure 4:
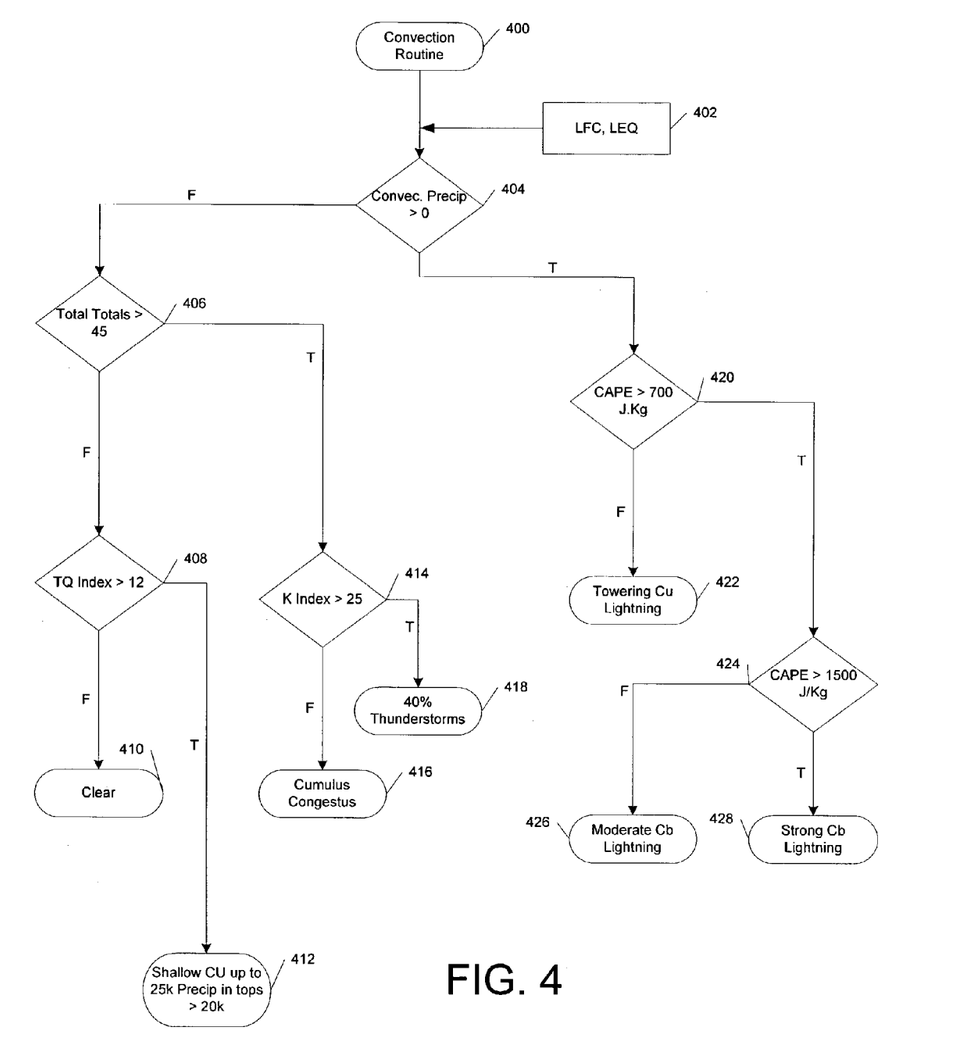
FIG. 4 is the flowchart illustrating the processes performed in generating a precipitation grid.

The convection routine of FIG. 4 is called to generate the precipitation forecast grids. If the convection routine (step 400) is called at step 302 of FIG. 3, Level of Free Convection (LFC) and Level of Equilibrium (LEQ) inputs are received at step 402. It is next determined at step 404 if the convection precipitation is greater than zero. If not, then at step 406 it is determined if the total Totals (i.e., totals of convective indices) are greater than 45. If not, then at step 408 it is determined if the TQ index (a convective index) is greater than 12. If not, then at step 410, it is determined that a clear visualization should be rendered; otherwise, at step 412, it is determined that shallow cumulus (CU) clouds up to 25,000 ft with precipitation in the tops greater than 20,000 feet should be rendered. If the total Totals at step 406 are greater than 45, then at step 414 it is determined if the K index is greater than 25. If not, at step 416, cumulus congestus clouds are to be forecast; otherwise, at step 418, 40% thunderstorms are to be forecast.

If the convection precipitation is greater than zero at step 404, then it is determined if the CAPE value is greater than 700 J/Kg (step 420). If not, then towering cumulus clouds and lightning are to be forecast. If so, at step 424, it is determined if the CAPE value is greater than 1500 J/Kg. If not, then moderate cumulonimbus (Cb) clouds and lightning are to be forecast; otherwise, strong cumulonimbus and lightning are to be forecast.

The results of the forecast engine 102 are presented to a weather data server 104 which can then provide the data for purposes of visualization. Those of ordinary skill will recognize that the resulting forecast database can also be used for other purposes, for example in predicting areas of severe weather for aircraft routing.

Referring again to FIG. 1, in accordance with a user-selected time, the weather data server 104 provides the gridded forecast weather data in a format that is preferably consistent the same for past, present, and future time periods. This advantageously allows for seamless and consistent representation of the weather regardless of time.

The data is then fed to a data processor 106 that converts the data into a format required by graphical element generators. The data processor 106 accepts user modifications to the data, for example, shifting cloud positions if the user disagrees with the forecast. The user inputs control the density of the clouds, the altitude of clouds, precipitation elements, animation of precipitation elements after they hit the ground, lightning frequency, placement of ground objects, radar overlays, and types of ground objects, etc.

In accordance with the user inputs and the grids received from the weather data server 104, the data processor 106 preferably provides three grids, one each to describe clouds 108, precipitation 110, and ground objects 112. Other types of grids may be produced in accordance with the requirements of the visualization output.

The three graphical element generators, cloud 114, precipitation 116, and ground 118, take into account the viewing frustum, (i.e., camera position, orientation, field of view), user-supplied parameters such as object density, and gridded data, and generate a collection of graphical elements, each of which represents one cloud, one precipitation object (rain drop, snowflake, etc.), or one ground object (a tree, shrub, house, etc.).

The elements generated by the generators 114, 116 and 118 are discreet data objects that define the placement and other characteristics of clouds, precipitating objects and ground objects. The graphical generators 114, 116 and 118 animate objects over time to depict cloud evolution, falling precipitation, splatting or bouncing of precipitation objects, and ground objects swaying in the breeze. Cloud elements may include types of clouds, as well as thunderstorms, virga, rainstreaks and fog. Precipitation includes raindrops, snowflakes, sleet, freezing rain and hail. Ground elements include trees, grass and other vegetation; structures, such as, houses, buildings, factories; animals, such as, birds, cows, deer, etc. It is noted that the above is not intended to be an all-exhaustive list of elements that can be generated by the system 100, as those of ordinary skill in the art would recognize that other elements are possible.

In accordance with the present invention, elements may react to their local environments. For example, clouds drift with the wind, flags flap in the wind, cows lie down when it is raining, the horizontal component of precipitation changes with wind speed, etc. Other elements and their interactions with their environment are possible. The ground element generator 118 may access a population density database to determine location and densities of various building types and a biome database to determine placement of various flora and fauna.

A renderer 126 renders a scene by, e.g., choosing the appropriate representation of the cloud, precipitation, or ground object from a texture database 128, applying the correct lighting attributes based on time, applies geometric distortions due to wind. In addition to rendering the objects themselves, the renderer 126 is also responsible for adjusting the sky color, horizon color, and appearance of stars, based on the time.

Figure 5:
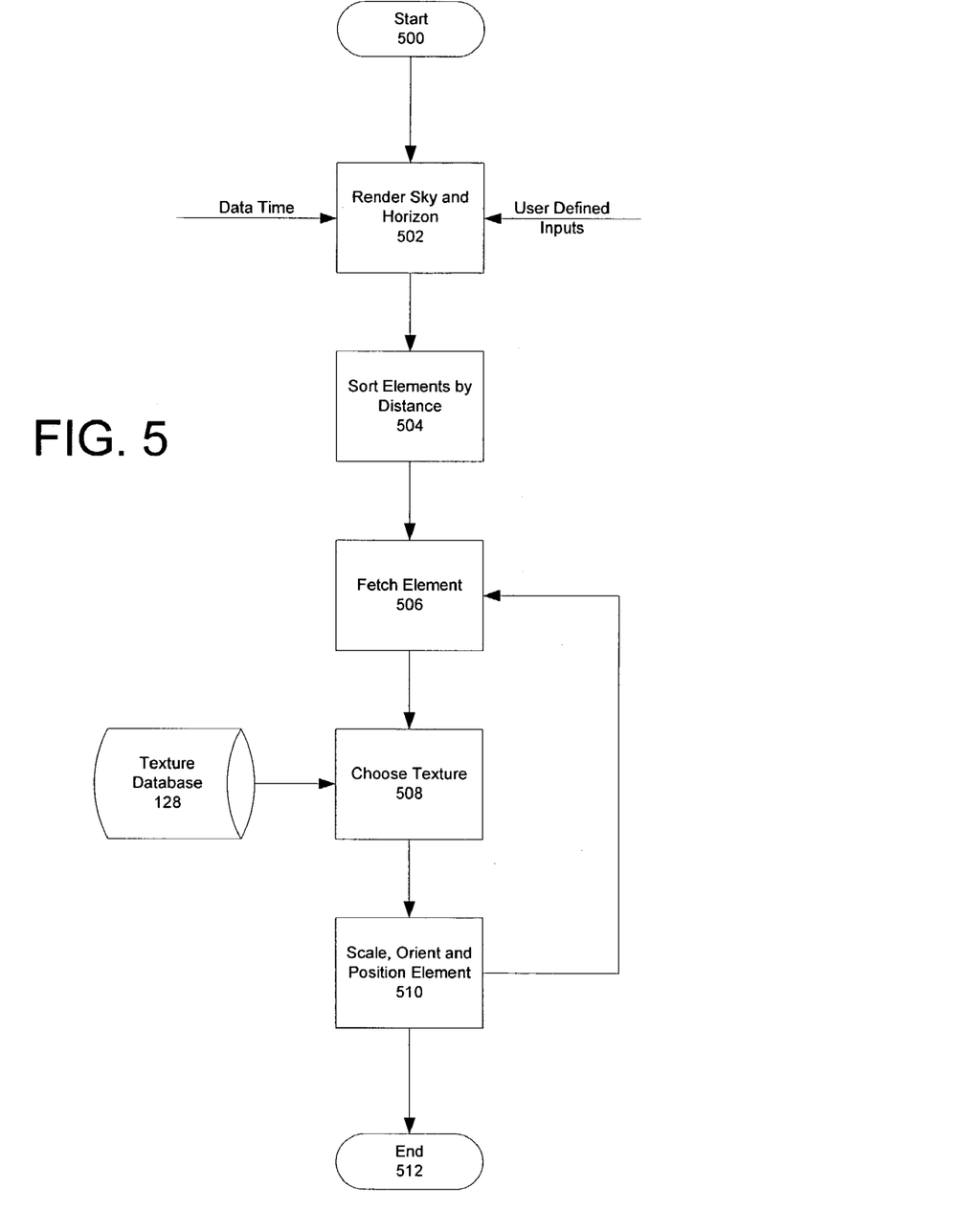
FIG. 5 is a flowchart illustrating the processes performed by a rendering engine.
Figure 6:
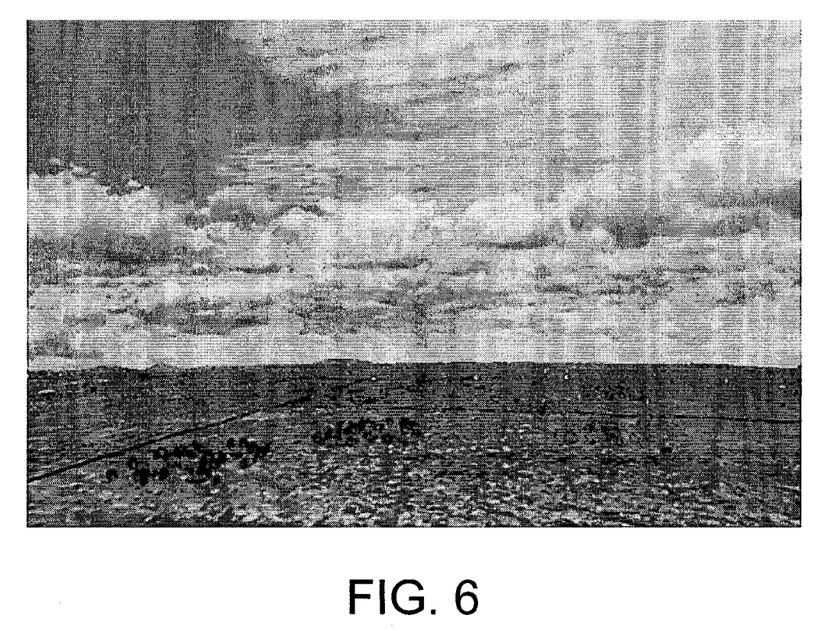
FIGS. 6–9 illustrate several exemplary graphical presentations in accordance with the present invention.
Figure 7:
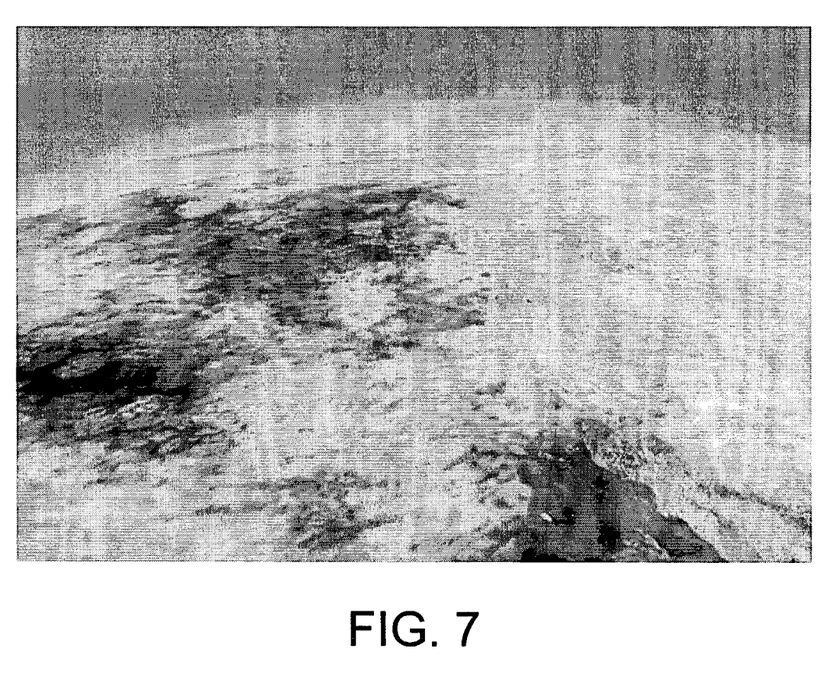
Figure 8:
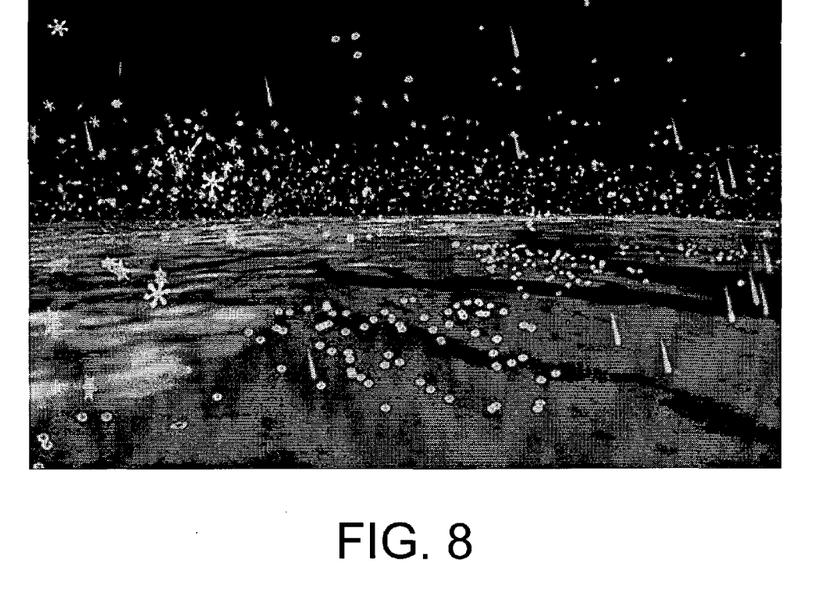
Figure 9:
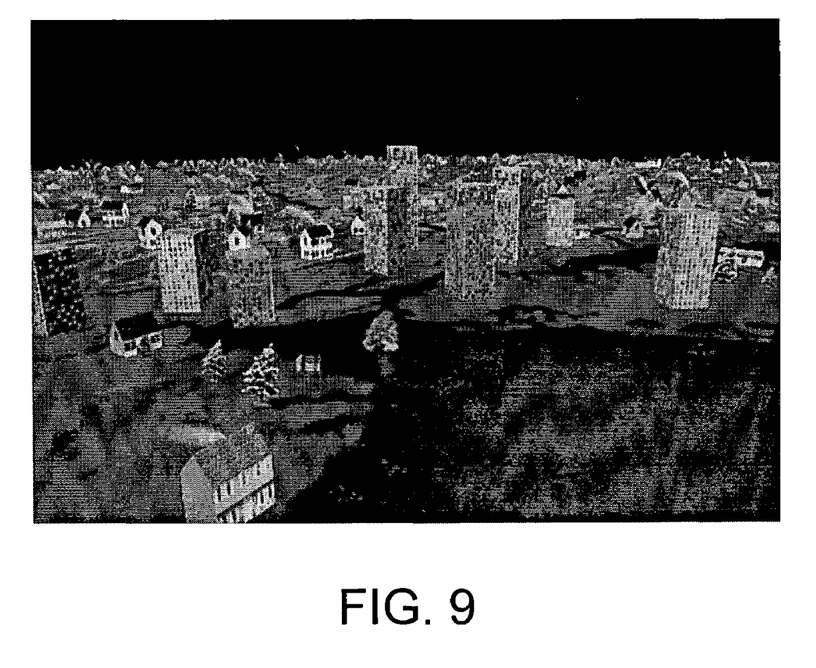

FIG. 5 illustrates the processes performed by the renderer 126 in further detail. The renderer 126 begins at step 500, and renders the sky and horizon in accordance with user defined inputs and time parameters (e.g., daylight or nighttime) at step 502. The elements to be forecast are sorted by distance (e.g., from front to back) at step 504. The elements include objects within the scene, such as the clouds, buildings, rain drops, etc. The elements are fetched at step 506 and a texture applied at step 508. The textures are stored in a database 128 and may include pictures of clouds, precipitation or other objects. The texture is applied to a polygon with an appropriate orientation. The polygon is scaled and positioned within a scene at step 510. The processes of steps 506, 508 and 510 are repeated for each element. Further in accordance with the present invention, non-photorealistic rendering may be implemented to produce unique looks (such as cartoon or impressionist). Further, the renderer 126 may overlay a clock face, time line, numeric time display, etc. to provide a visualization of time to a viewer.

Referring to FIGS. 6–9, there is illustrated exemplary visualizations generated by the system 100 showing cloud cover, ground elements and precipitation. FIGS. 6–9 are presented herein for exemplary purposes, as those of ordinary skill in the art will recognize other visualizations are possible. The visualizations may be provided by the system 100 via over-the-air broadcast television, cable or satellite. In addition, the visualizations may be streamed over a wide area network, such as the Internet or cellular 3G services.

Thus, as described above, the system of the present invention advantageously utilizes data from a forecast and other databases to generate visualizations without the requirement of conventional systems that such visualizations be generated in advance. Further, the system of the present invention updates visualizations as updates are received by the databases. Accordingly, no user interaction is required to update the forecast visualizations as in conventional systems.

While the present invention has been described in connection with the preferred embodiments of the various Figs., it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A system for generating a visualization of future weather conditions, comprising:
a forecast engine that generates weather forecasts;
a weather data server that stores said forecasts;

a data processor that retrieves and processes forecast information from the weather data server in accordance with predetermined inputs;

an element generator that converts said forecast information into graphical elements; and a renderer which receives said graphical elements and renders a sequence of plural images for a specific geographic region, for a specific range of times, wherein the sequence of plural images reflects the changes in weather forecast information for the specified range of times.

2. The system of claim 1, wherein the forecast engine receives a plurality of gridded computer models, radar data, satellite imagery and synoptic reports as input to generate said weather forecasts.

3. The system of claim 2, wherein the forecast engine uses said inputs to generate said weather forecasts such that said weather forecasts are seamless over time with respect to observed current and past weather conditions.

4. The system of claim 2, wherein forecast errors are determined by comparing previous forecasts with observed weather conditions and wherein said forecast errors are used as corrections to said forecast.

5. The system of claim 2, wherein said weather forecast generated includes at least one of cloud types, cloud levels, cloud density, precipitation types, precipitation rate and lightning probability.

6. The system of claim 2, wherein said weather forecast is generated for a sequence of times extending from the current time into the future.

7. The system of claim 2, wherein said weather forecast is generated for multiple levels of the atmosphere.

8. The system of claim 1, wherein a weather data server can provide forecast information for a specific time in the past or future.

9. The system of claim 1, wherein the forecast information is adapted to be modified with respect to value, temporality or geographic location.

10. The system of claim 1, wherein graphical elements are selected for rendering based on forecast weather conditions for the geographic location to be rendered.

11. The system of claim 10, wherein the graphical elements include at least one of clouds, precipitation, lightning, waves, plant life, structure and animals.

12. The system of claim 11, wherein said cloud elements are defined by at least one of cloud evolution, cloud type, virga and fog.

13. The system of claim 11, wherein said precipitation elements are defined by at least one of raindrops, snowflakes, sleet, freezing rain and hail.

14. The system of claim 11, wherein the plant life, structures and animals are modified visually such that they are affected by conditions indicated by said forecast information.

15. The system of claim 11, wherein said plant life, structures and animals are selected by said system such that they are geographically appropriate to the geographic region to be rendered.

16. They system of claim 10, wherein a plurality of graphical elements are provided to be rendered and wherein predetermined ones of said graphical elements are used to create said visualization.

17. The system of claim 10, wherein said graphic elements are rendered for a predetermined geographic location and range of times.

18. The system of claim 17, wherein said geographic location is adapted to be modified over time such that a fly-through animation is generated.

19. The system of claim 17, wherein the system selects from a plurality of visualization techniques such that the visual representation of the forecast information is visually correct for said geographic positions.

20. The system of claim 17, wherein said graphical elements are rendered relative to a three dimensional representation of the earth.

21. The system of claim 17, wherein said graphical elements are rendered such that they are visually correct with respect to the specific time of day for which the forecast is rendered.

22. The system of claim 17, where said visualization incorporates a time indicator selected from the group consisting of a clock face, a time line, a numeric time display.

23. The system of claim 17, wherein said range of times includes times in the past, present or future.

24. The system of claim 23, wherein the rendered visualization is visually consistent across the selected range of times, regardless whether the time is in the past, present or future.

25. The system of claim 1, wherein the rendered visualization is output via a broadcast medium, wherein said broadcast medium comprises at least one of over-the-air television, cable, satellite, a wide area network, and cellular services.

26. A method for generating a visualization of future weather conditions, comprising:

generating weather forecasts from raw weather data;

processing the weather forecasts in accordance with received inputs to determine forecast information;

converting said forecast information into graphical elements;

rendering said graphical elements into a sequence of plural images for a specific geographic region, for a specific range of times, such that said sequence of plural images reflects the changes in weather forecast information for the specified range of times.

27. The method of claim 26, further comprising receiving a plurality of gridded computer models, radar data, satellite imagery and synoptic reports as input to generate said weather forecasts.

28. The method of claim 27, wherein said weather forecasts are seamless over time with respect to observed current and past weather conditions.

29. The method of claim 27, further comprising:

determining forecast errors by comparing previous forecasts with observed weather conditions; and correcting said forecast with said forecast errors.

30. The method of claim 27, wherein said weather forecast includes at least one of cloud types, cloud levels, cloud density, precipitation types, precipitation rate and lightning probability.

31. The method of claim 27, further comprising generating said weather forecast for a sequence of times extending from the current time into the future.

32. The method of claim 27, further comprising generating the forecast for multiple levels of the atmosphere.

33. The method of claim 26, further comprising providing said forecast information for a specific time in the past or future.

34. The method of claim 26, wherein the forecast information is adapted to be modified with respect to value, temporality or geographic location.

35. The method of claim 26, further comprising selecting said graphical elements based on forecast weather conditions for the geographic location to be rendered.

36. The method of claim 35, wherein the graphical elements include at least one of clouds, precipitation, lightning, waves, plant life, structure and animals.

37. The method of claim 36, wherein said cloud elements are defined by at least one of cloud evolution, cloud type, virga and fog.

38. The method of claim 36, wherein said precipitation elements are defined by at least one of raindrops, snowflakes, sleet, freezing rain and hail.

39. The method of claim 36, further comprising visually modifying the plant life, structures and animals such that they are affected by conditions indicated by said forecast information.

40. The method of claim 36, further comprising selecting said plant life, structures and animals such that they are geographically appropriate to the geographic region to be rendered.

41. They method of claim 35, further comprising providing a plurality of graphical elements to be rendered and using predetermined ones of said graphical elements to create said visualization.

42. The method of claim 35, further comprising rendering said graphic elements for a predetermined geographic location and range of times.

43. The method of claim 42, further comprising generating a fly-through animation by modifying said geographic location over time.

44. The method of claim 42, further comprising selecting from a plurality of visualization techniques such that the visual representation of the forecast information is visually correct for said geographic positions.

45. The method of claim 42, further comprising rendering said graphical elements relative to a three dimensional representation of the earth.

46. The method of claim 42, further comprising rendering said graphical elements such that they are visually correct with respect to the specific time of day for which the forecast is rendered.

47. The method of claim 42, further comprising rendering incorporating a time indicator selected from the group consisting of a clock face, a time line, a numeric time display.

48. The method of claim 42, wherein said range of times includes times in the past, present or future.

49. The method of claim 48, wherein the rendered visualization is visually consistent across the selected range of times, regardless whether the time is in the past, present or future.

50. The method of claim 26, further comprising outputting the rendered visualization via a broadcast medium, wherein said broadcast medium comprises at least one of over-the-air television, cable, satellite, a wide area network, and cellular services.

51. A method for generating weather forecasts from raw weather data, comprising
receiving observational and atmospheric model weather data;
analyzing said raw weather data;
performing a re-analysis to determine realistic weather parameters and forecast errors; and
determining a set of grids in accordance with said analysis representative of a short term forecast and a medium range forecast,
wherein said grids provide a time-coherent, seamless weather forecast over past, present and future times.

52. The method of claim 51, wherein receiving observational and atmospheric model weather data includes receiving a plurality of gridded computer models, radar data, satellite imagery and synoptic reports.

53. The method of claim 51, further comprising:
determining forecast errors by comparing previous forecasts with observed weather conditions; and
correcting said forecast with said forecast errors.

54. The method of claim 51, wherein said weather forecast includes at least one of cloud types, cloud levels, cloud density, precipitation types, precipitation rate and lightning probability.

55. The method of claim 51, further comprising generating said weather forecast for a sequence of times extending from the current time into the future.

56. The method of claim 51, further comprising generating the forecast for multiple levels of the atmosphere.

* * * * *